United States Patent [19]
Louis

[11] Patent Number: 5,339,916
[45] Date of Patent: Aug. 23, 1994

[54] SELF SEEKING NEUTRALLING ARRANGEMENT FOR A POWER ASSISTED CLEANER

[75] Inventor: Jeffrey S. Louis, Akron, Ohio

[73] Assignee: The Hoover Company, North Canton, Ohio

[21] Appl. No.: 54,420

[22] Filed: Apr. 5, 1993

[51] Int. Cl.⁵ .................... A47L 9/00; B62D 51/04
[52] U.S. Cl. .................... 180/19.3; 15/340.2;
  74/527; 74/543; 403/321; 403/322; 403/325
[58] Field of Search ............ 180/19.1, 19.2, 19.3;
  74/527, 543; 403/321, 322, 325; 15/340.2

[56] References Cited

U.S. PATENT DOCUMENTS

| | | | |
|---|---|---|---|
| 593,222 | 11/1897 | Humphrey | 403/325 |
| 2,075,483 | 3/1937 | Trotter | 403/325 |
| 2,138,239 | 11/1938 | Irgens | 180/19.3 |
| 2,138,279 | 11/1938 | Kneisley | 180/19.1 |
| 3,618,687 | 11/1971 | Ripple et al. | 15/340.2 |
| 4,249,281 | 2/1981 | Meyer et al. | 15/340.2 |
| 4,342,369 | 8/1982 | Ransom | 15/340.2 |
| 4,347,643 | 9/1982 | Bair, III | 15/340.2 |
| 4,537,100 | 8/1985 | Palm | 403/325 |
| 4,624,027 | 11/1986 | Martin | 15/340.2 |
| 4,685,485 | 9/1989 | Finnefrock, Sr. | 403/325 |
| 4,845,803 | 7/1989 | King | 15/339 |

*Primary Examiner*—Mitchell J. Hill

[57] ABSTRACT

A power assisted vacuum cleaner is provided with a hand grip neutralling arrangement which is self seeking or presettable to provide a neutral position for the actuating linkage of the cleaner. A neutralling spring constantly urges a neutralling pin towards neutralling position and it is freed by movement of a manually operated button to seek this position.

8 Claims, 4 Drawing Sheets

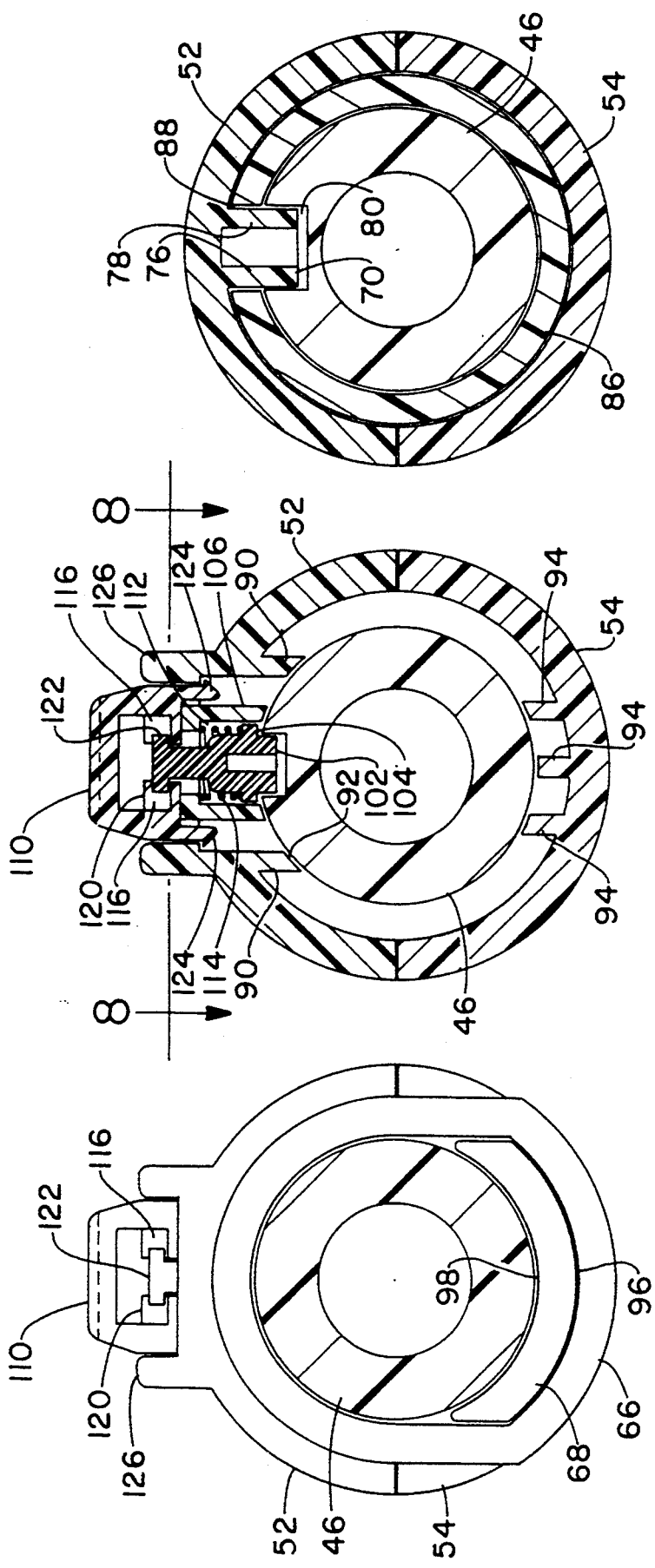

SELF SEEKING NEUTRALLING ARRANGEMENT FOR A POWER ASSISTED CLEANER

BACKGROUND OF THE INVENTION

1. Field of the Invention

This invention relates to power assisted upright cleaners or the like and, more specifically, to a neutralling arrangement for the actuating linkage of such a power assisted appliance.

2. Summary of the Prior Art

Manipulation of the actuating linkage of a power drive cleaner or other allied appliance such as a power drive for a power assisted lawn mower by reciprocation of an attached hand grip of such an appliance is well known. It is also well known to provide a positive stop for the hand grip in its reciprocation along the handle for neutralling the actuating linkage. Such positive stops have taken the form of a hand grip mounted manually manipulated oppositely spring urged button-pin member that engage in a handle bore, an oppositely urged leaf spring detent forced by a handle button into such a handle bore, a rocking bore aperture engaging locking lever, a rotating pin carried by a hand grip movable into a short side slot and an aperture engaging spring detent driven by a rotatable ring member.

Although all of these prior art structures offer some advantages, not all of them include a self seeking or presetting feature. The two having this feature appear to be the one having a leaf spring detent and the one having a rotatable ring member. The first of these suffers, e.g., by the utilization of a long, bent cantilever spring proving presetting and the dependence on this spring for a large number of cycles over the life of its cleaner. The second of these suffers, e.g., by the fact that it requires a rotary operator motion for presetting rather than an erogonimically easier straight line movement and again the use of a leaf spring, albeit an annular one.

Accordingly, an object of this invention is to provide an improved neutralling arrangement for a power assisted cleaner.

It is an additional object of the invention to provide a neutralling arrangement for a power assisted appliance having a self seeking or presettable attribute.

It is a further object of the invention to provide a neutralling arrangement having a neutralling pin constantly urged towards neutral position.

It is a still further object of the invention to provide a neutralling arrangement where a manually operated neutralling button releases a neutralling pin for movement towards neutralling position.

SUMMARY OF THE INVENTION

A power assisted appliance such as a vacuum cleaner includes a power unit in the foot of the appliance that drives its wheels forwardly or reversely dependent upon the positioning of a clutch actuating linkage extending upwardly in or along its handle where it attaches to a hand grip. The hand grip slidingly reciprocates to move the actuating linkage in its clutching or declutching action.

The hand grip has a neutral position on the handle when the appliance is essentially declutched. This neutralling position is obtained by the use of pin carried by the hand grip that moves inwardly to engage in an aperture bore in the handle. The neutralling pin is disposed to extend axially between the hand grip and handle and is always spring urged inwardly by an expansion spring captivated between an inner shoulder on it and the hand grip. A button sliding axially along the hand grip includes an angled ramp that engages under an outer shoulder of the neutralling pin. When the button's ramp is at its lowest most inward position, it permits the neutralling pin's expansion to urge the neutralling pin inwardly to preset the pin or give it in a self seeking function. Neutralling detents maintain this preset position of the pin. Then, upon alignment of the neutralling pin with the aperture bore in the handle, the pin automatically moves into the aperture bore to fixedly arrest the hand grip and provide neutralling of the appliance.

The neutralling pin is released by reciprocation of the manual button in the opposite direction interposing the high point of its ramp beneath the outer shoulder of the neutralling pin. This causes the pin to cammingly withdraw from engagement with the handle so that the hand grip may again be moved to clutch or declutch the power drive of the appliance. Detents maintain this position of the actuating button.

BRIEF DESCRIPTION OF THE DRAWINGS

Reference may now be had to the accompanying Drawings for a better understanding of the invention, both as to its organization and function, with the illustration showing a preferred embodiment, but being only exemplary, and in which:

FIG. 5 is a cross-sectional elevational view of the handle and hand grip structure of FIG. 2 and taken on line 5—5 of this Figure;

FIG. 6 is a view similar to FIG. 5 but taken on line 6—6 of FIG. 2;

FIG. 7 is also a similar view but it is taken on line 7—7 of FIG. 2; and

DETAILED DESCRIPTION OF THE INVENTION

Figure 1:
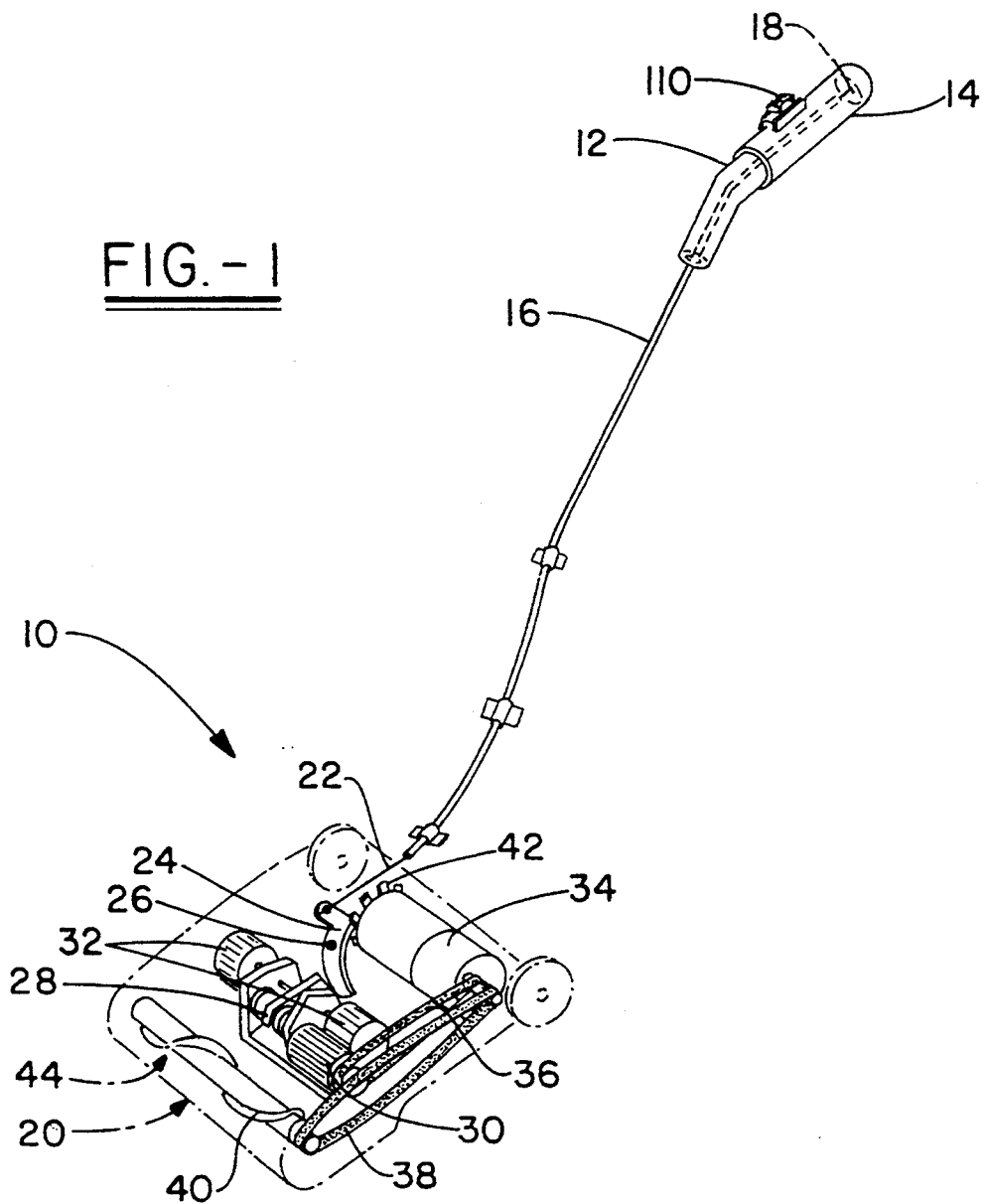
FIG. 1 is a right perspective view of a cleaner, shown somewhat schematically, which might incorporate the invention.

There is shown in FIG. 1 an upright vacuum cleaner 10 having upwardly a handle 12 surmounted by, as is conventional, a reciprocating hand grip 14. The hand grip 14 is attached to a Bowden cable wire 16 at an inner connection 18, with the Bowden wire cable 16 extending downwardly and inwardly through the hand grip 14 and handle 12. The Bowden wire cable 16 may then lead down to a main body nozzle 20 with fastening connectors 22 fastened internally in a hard bag or the like (not shown) to slidingly receiving the Bowden wire cable 16. The Bowden wire cable 16 may also be led (not shown) directly down the handle 12 as it extends (not shown) to the main body nozzle 20.

In the main body nozzle wire 22 of the Bowden wire cable 16 is attached to a crank arm 24 having a pivot connection 26 under the hood (shown dashed) in the main nozzle body 20. This crank arm as turned by Bowden wire cable wire 22, and it can be seen to reciprocatorily move a bearing piece 26 that effectively forwardly and reversely clutches and then declutches a power drive 30 of which it is a part. The outer sides of this power drive included drive wheels 32, 32 that provide tractive force for power assist for vacuum cleaner 10. The showing of the Bowden wire and its connection and its relation to the power drive 30 is somewhat schematic but is old and well known.

The power drive 30 is energized through an electric motor 34 that drives a belt 36 rotatingly attached to the power drive 30. The motor 34 also drives a fan 42 and a belt 38 which rotates an agitator 40. The fan receives an airflow along the far side of the main nozzle body 20 from a forwardly disposed suction nozzle 44 within which is housed the agitator 40. Insofar as described, power assisted vacuum cleaner 10 is substantially conventional.

Figure 3:
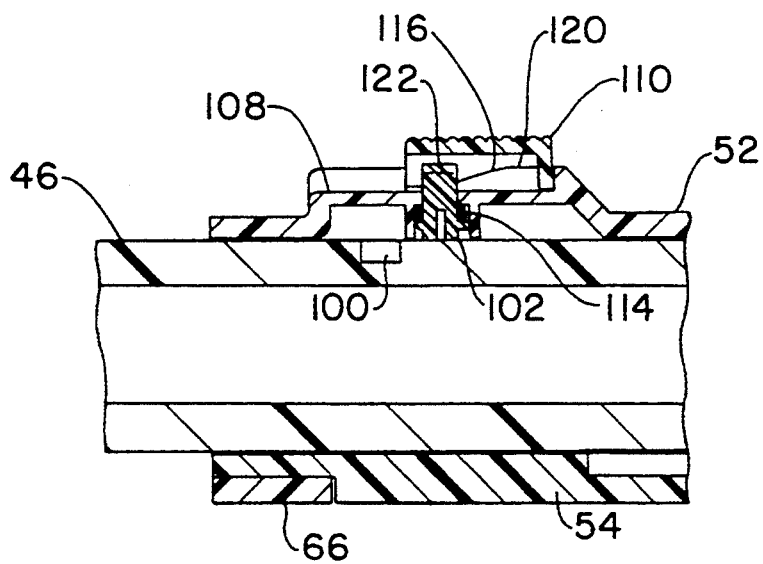
FIG. 3 is a view similar to FIG. 2 with the manual button and neutralling pin preset for neutralling prior to neutralling alignment of the hand grip.

Turning now to the inventive aspects of this Application, it can be seen (FIGS. 2–4) that a hollow handle core 46 of generally cylindrical shape extends integrally out of an upper end 48 of handle 12 to surmount it and mount thereon the hand grip 14. Handle core 46 includes a bend 50 immediately above the upper termination of handle 12 with it to place the hand grip 14 in a readily graspable position for the operator of the vacuum cleaner 10.

Hand grip 14 is generally tubular in outline with its configuration formed by the mating of an upper handle piece 52 of generally semi-cylindrical shape and a lower handle piece 54 of similar shape. These two pieces join at their rears by rear tip pieces 56, 58 both of semispherical shape. An internal threaded boss 60 projecting inwardly of the inner surface of upper handle piece 52 receives a screw 62 to pull an external hollow, inwardly projecting boss 64 on lower handle piece 54 tight against it to mold the upper and lower pieces 52, 54 together at their rears. At the hand grip's front end, upper handle piece 52 forms a continuous ring piece 66 of oblong shape into which a forward stepped in portion 68 of lower handle piece 54 is telescoped to hold these two handle pieces together at their fronts. Although the jointure of these two pieces on each side show abutting shoulder edges, these edges could be stepped to make their assembly even more secure.

Upper handle piece 52 may include, internally, along its uppermost internal surface, an integral open downwardly extending box section 70 having front and rear walls 72, 74 and side connecting walls 76, 78. This box section extends downwardly into an upwardly opening rectangular groove 80 formed in handle core 46. This groove is sized transversely of the handle core 46 to be slightly wider than the distance between the outer faces of the side walls 76, 78 to provide a substantially aligned guidance for the hand grip 14 as it reciprocates relative to the vacuum cleaner handle 12. The groove 80 has forward and rearward terminating walls 82, 84, respectively, which limit the travel of the hand grip 14, with these walls spaced sufficiently far apart as to provide for clutching and declutching of vacuum cleaner 10 as it is driven forwardly and rearwardly.

A bearing sleeve 86 is interposed between the reciprocating hand grip 14 and the handle core 46. This sleeve also has a rectangular through slot 88 of a size, essentially, slightly larger than the size of box section 70 so that the box section 70 may extend therethrough it into the groove 80. It should be apparent, then, that the bearing sleeve 86 is driven by the movement of hand grip 14 in a reciprocatory manner over handle core 46, thereby providing a large relatively uninterrupted bearing surface therebetween at the medial and a portion of the rearward end of hand grip 14.

At the forward end of hand grip 14, is provided, for easy sliding movement over the bearing sleeve 46, structure on the upper and lower hand grip pieces 52 and 54. Upper handle piece 52 includes a pair of inwardly integral inwardly and downwardly extending projecting extending rib sections 90, 90 having internal arcuately shaped end surfaces 92, 92 while lower handle piece 54 includes a series of three integral inwardly and upwardly extending ribs 94, 94, 94 all of these ribs also having arcuate end surfaces. The hand grip, at its front, utilizes these arcuate end surfaces and an internal annular arcuate lower surface 96 of front stepped portion 68 of lower handle piece 54 and an internal, arcuate upper front surface portion 98 of this same element to provide guidance for hand grip 14 at it reciprocates over handle core 46.

Figure 2:
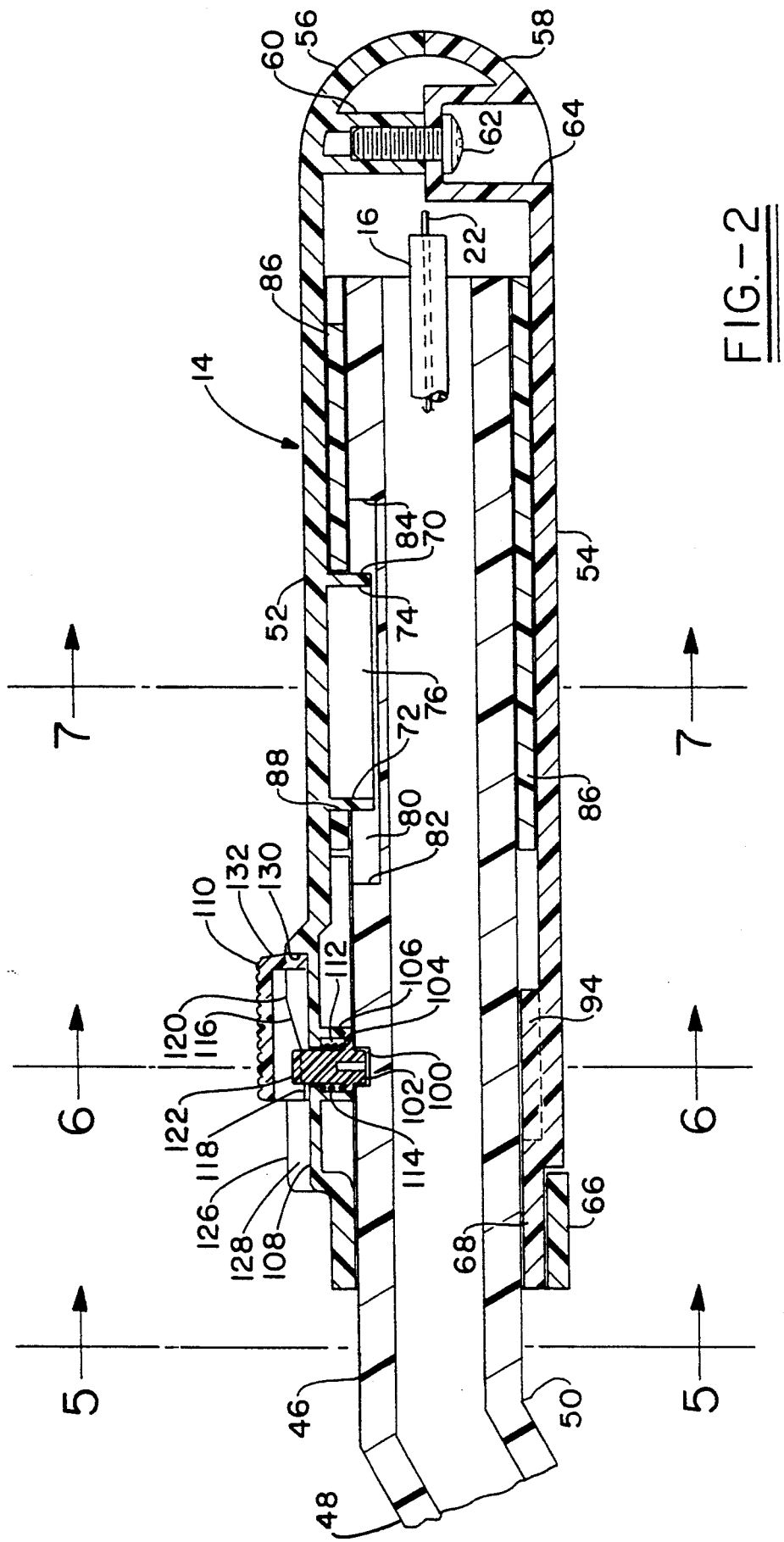
FIG. 2 is a cross-sectional elevational view of the hand grip end of the cleaner handle with the hand grip in neutral position.

The Bowden wire cable 18 with its wire 22, shown partially at the rear of the hand grip 14 in FIG. 2, is connected by any convenient means to it, for forward and rearward movement of it up and down the handle 12. Although this connection forms no part of the invention, a hooked end (not shown) of wire 22 may be captivated in a boss formed well such as shown in U.S. Pat. 4,845,803, issued Jul. 11, 1989 and owned by a common assignee. In the instant Application, this well is disposed beside the location of the screw 62 or, in other words, axially transverse of the screw and is not discernable in FIGS. 2–4 because of the location of their section lines. However, the boss formed well could be located as shown in the Patent by merely relocating the screw 62 somewhat forwardly of its present location.

The handle core 46 includes a neutralling bore 100; this takes the form of a blind bore but is of sufficient depth to receive a neutralling pin 102, generally cylindrical in its lower portion, therein. This pin is limited in its reciprocal inserting movement by an integral outwardly extending annular shoulder 104. Neutralling pin 102 is mounted for this reciprocating movement in upper handle piece 52 in an integral downwardly depending hollow cylindrical boss housing 106 which is integrally attached at its upper end to a flat floor piece 108 that serves as the sliding plane for a manually operated button 110. Neutralling pin 102 extends through the floor piece 108 by means of a through bore 112 in the floor piece 108.

An expansion spring 114 is disposed about the neutralling pin 102 below the floor piece 108 so as to expandingly engage against its bottom surface and the top surface of the annular shoulder 104 of neutralling pin 102. The neutralling pin 102 is thereby continuously urged towards the neutralling position, i.e., towards handle core 46 and its neutralling bore 100. The button 110 includes structure to resist this movement.

Button 110 has a pair of equally angled, one way cam ramps 116, 116 having at each of their ends front and rear flattened lead in track portions 118, 120, respectively. An upper, second shoulder 122 at a rectangularly sectioned portion 123 of neutralling pin 102, disposed above the extension of neutralling pin 102 through bore 112, engages over the top surfaces of the cam ramps 116, 116 so that movement of the button 110 rightwardly or leftwardly lifts the neutralling pin outwardly out of neutralling position against the force of expansion neutralling spring 114 or permits neutralling to occur if neutralling bore 100 in handle core 46 is aligned with neutralling pin 102.

The button 110 is maintained mounted for sliding movement on the floor piece 108 by a pair of integral oppositely disposed and oppositely facing locking barbs 124, 124 that engage beneath ledges formed by extended shoulder members 126, 126 of a button retaining housing 127, integral with upper handle piece 52, and extending upwardly from extended ribs 90, 90.

A slot 128 is formed between these shoulders to permit button 110 to move slidingly along handle grip 14. The button 110 is limited in its rearward movement by abutting against an end face 130 of slot 128 and is limited in its forward movement by abutting engagement of the rear side of neutralling pin 102 with an adjacent face of a rear wall 132 of button 110.

The operation of the invention should now be clear. When the button 110 is slid to its rearmost position (FIGS. 2 and 3), the neutralling pin 102 is freed from interference by the one way cam ramps 116, 116 so that the expansion neutralling spring 114 may now force the neutralling pin 102 towards neutralling position. If the neutralling bore 100 is aligned diametrically with the pin neutral is reached (FIG. 2). If the neutralling bore 100 is not diametrically aligned (FIG. 3), the neutralling pin is in what could be called a cocked condition, ready to enter the neutralling bore 100 upon diametrical alignment occasioned by reciprocation of hand grip 14 relative to handle core 46.

In the cocked condition of the neutralling pin 102, the button 110 is held in its rear position by friction between its integral detents 134, 134 and detent receiving depressions 138, 138 on the inner surface of extended shoulders 126, 126 of button retaining housing 127. Thereby, making the neutralling system one that is preset or self seeking since, once set or cocked, the neutralling pin 102 automatically seeks the neutralling bore 100 as the hand grip 14 is moved relative to the handle 12.

Figure 4:
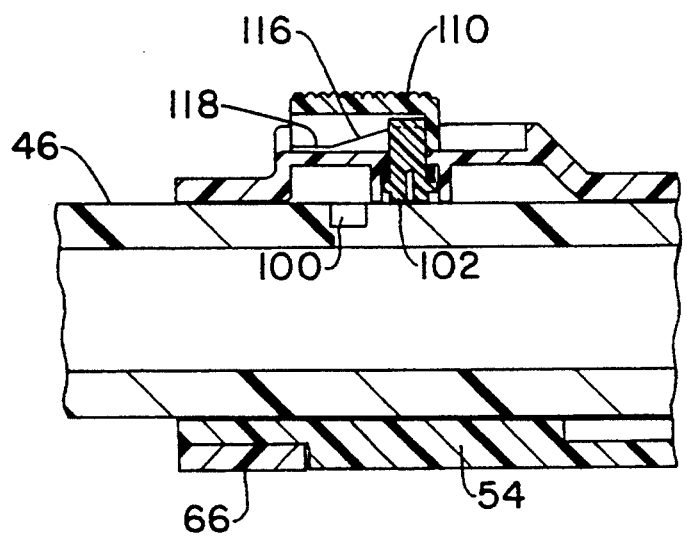
FIG. 4 is also a view similar to FIG. 3 but with manual button placing the pin in a non neutralling position.
Figure 8:
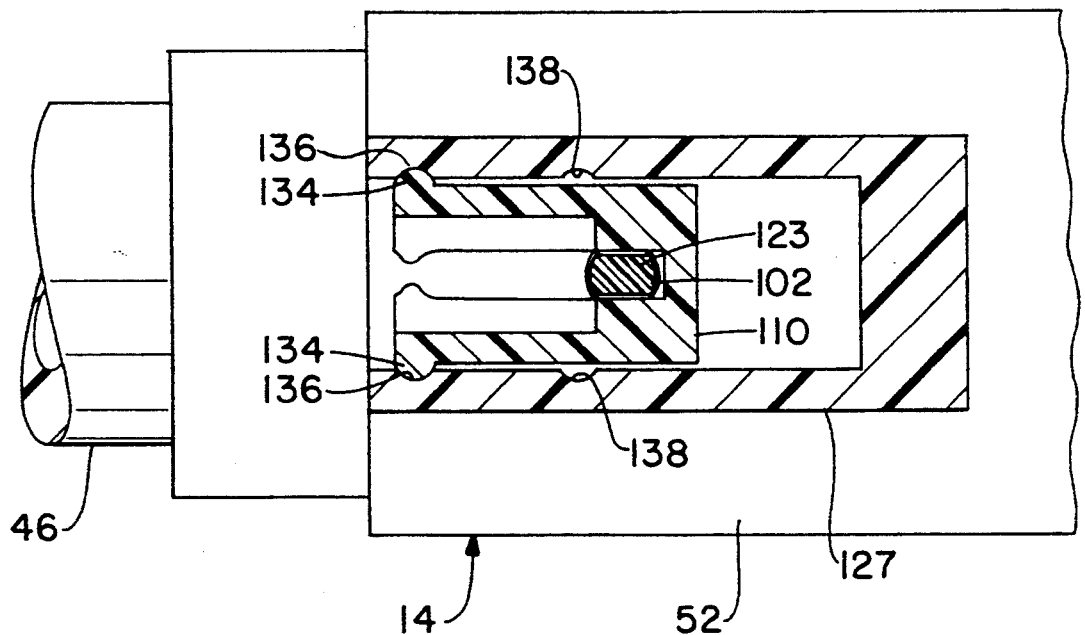
FIG. 8 is a cross-sectional plan view of the button arrangement taken on line 8-8 of FIG. 6.

The illustration of the invention in FIG. 4 shows the neutralling pin 102 in an uncocked, unset condition since neutralling is prevented by track 120. The pin 102 is held outwardly by this track and is not effectively urged inwardly against or into the handle core 46. A second set of detent receiving depressions 136, 136 arrests the movement of the button 110 at this non-neutralling position and prevents inadvertent movement of it.

It should now be clear that the invention just related fully meets the objects set out for it in the beginning of the description. It should also be obvious that many modifications could be made to it by one skilled in the art that would still fall within its spirit and purview.

What is claimed is:

1. A neutralling positioning arrangement for a power assisted cleaner including:
   a) an axially reciprocating hand grip;
   b) a clutching arrangement for said power assisted cleaner;
   c) a motor and motor drive for said power assisted cleaner;
   d) said clutching arrangement providing clutching for said motor drive;
   e) said reciprocating hand grip remotely attached to said clutching arrangement for actuation of said clutching arrangement;
   f) a neutralling pin movably mounted on said hand grip for placing said hand grip in a neutral position; and
   g) a spring mounted with said hand grip and disposed to continuously urge said pin inwardly of said hand grip towards said neutralling position.

2. The neutralling positioning arrangement for a power assisted cleaner according to claim 1 wherein:
   a) said hand grip includes camming means engageable with said pin and axially movable to move to a non-interfering position with said pin to permit said pin free movement towards said inner, neutralling position.

3. The neutralling positioning arrangement for a power assisted cleaner as set out in claim 2 wherein:
   a) said hand grip is mounted axially reciprocatory on a handle for said power assisted cleaner;
   b) said handle includes a neutralling detent; and
   c) said pin automatically seeks said detent, upon axial reciprocation of said hand grip, when said camming means moves to said non-interfering position.

4. The neutralling positioning arrangement for a power assisted cleaner as set out in claim 3 wherein:
   a) a movable button is mounted with said hand grip;
   b) said camming means is drivingly urged by said button; and
   c) said button also reciprocates axially along said hand grip.

5. The neutralling positioning arrangement for a power assisted cleaner as set out in claim 4 wherein:
   a) said button, upon movement, reverse to its neutralling direction, moves said camming means against the force of said spring to move said pin outwardly and prevent neutralling of said pin.

6. The neutralling positioning arrangement for a power assisted cleaner as set out in claim 5 wherein:
   a) detents are provided for said axially reciprocating button to limit its reciprocating movement.

7. A neutralling arrangement for a power assisted cleaner including:
   a) a driving motor for said cleaner;
   b) a clutch arrangement for said motor;
   c) a clutch actuating linkage;
   d) a handle having a hand grip mounted reciprocally thereon;
   e) a neutralling pin movably mounted on said hand grip of said power assisted cleaner;
   f) a neutralling aperture in said handle;
   g) said neutralling pin engageable with and disengageable from said neutralling aperture;
   h) said neutralling pin being spring urged by a spring so as to be in cocked condition with said spring compressed so said pin is urgingly predisposed to enter said neutralling aperture by urging of said spring; and
   i) said neutralling pin moving only linearly.

8. A neutralling arrangement for a power assisted appliance including:
   a) a driving motor;
   b) a clutch;
   c) a clutch actuating linkage;
   d) a handle attached to said power assisted appliance;
   e) a presettable neutralling pin, resiliently preset by a spring to be urged towards a neutralling position in engagement with said handle and mounted with said handle to move into said engagement in said neutralling position;
   f) an operator manipulated button for enabling said neutralling pin to move towards said neutralling position;
   g) said pin movable in a straight line to attain said neutralling position; and
   h) said button, upon moving in at least one direction, permitting said neutralling pin to assume said preset position for eventual movement to said neutralling position.

* * * * *